US012656627B2

(12) United States Patent　　　　(10) Patent No.:　US 12,656,627 B2

Huang　　　　　　　　　　　　　　(45) Date of Patent:　Jun. 16, 2026

(54) COMBINED STRUCTURE OF LENS AND SOFT ELASTOMER

(71) Applicant: OURAD SAFETY CO., LTD., Tainan City (TW)

(72) Inventor: Pin-Tsung Huang, Tainan (TW)

(73) Assignee: OURAD SAFETY CO., LTD., Tainan City (TW)

( * ) Notice: Subject to any disclaimer, the term of this patent is extended or adjusted under 35 U.S.C. 154(b) by 351 days.

(21) Appl. No.: 18/450,684

(22) Filed: Aug. 16, 2023

(65) Prior Publication Data

US 2025/0060613 A1　　Feb. 20, 2025

(51) Int. Cl.
G02C 1/00　　　　(2006.01)

(52) U.S. Cl.
CPC ...................................... G02C 1/10 (2013.01)

(58) Field of Classification Search
CPC .............................. G02C 1/10; G02C 2200/16
See application file for complete search history.

(56) References Cited

U.S. PATENT DOCUMENTS

2010/0271586 A1 * 10/2010 Hadehara ................. G02C 1/02
351/140

FOREIGN PATENT DOCUMENTS

TW　　　M597878 U　　7/2020
TW　　　M619746 U　　11/2021

* cited by examiner

*Primary Examiner* — James C. Jones
(74) *Attorney, Agent, or Firm* — Rosenberg, Klein & Lee

(57)　　　　ABSTRACT

A combined structure of a lens and s soft elastomer is disclosed. The lens has an upper edge that includes a combining portion, wherein the combining portion has at least one surface formed as a roughened surface. The elastomer is integrated with the combining portion as a unity through an over-molding process. By roughening the surface of the combining portion, enhanced engaging force and all-around combination between the elastomer and the combining portion can be achieved. The combined structure prevents the elastomer and the lens from separation and thereby enhances industrial safety.

10 Claims, 8 Drawing Sheets

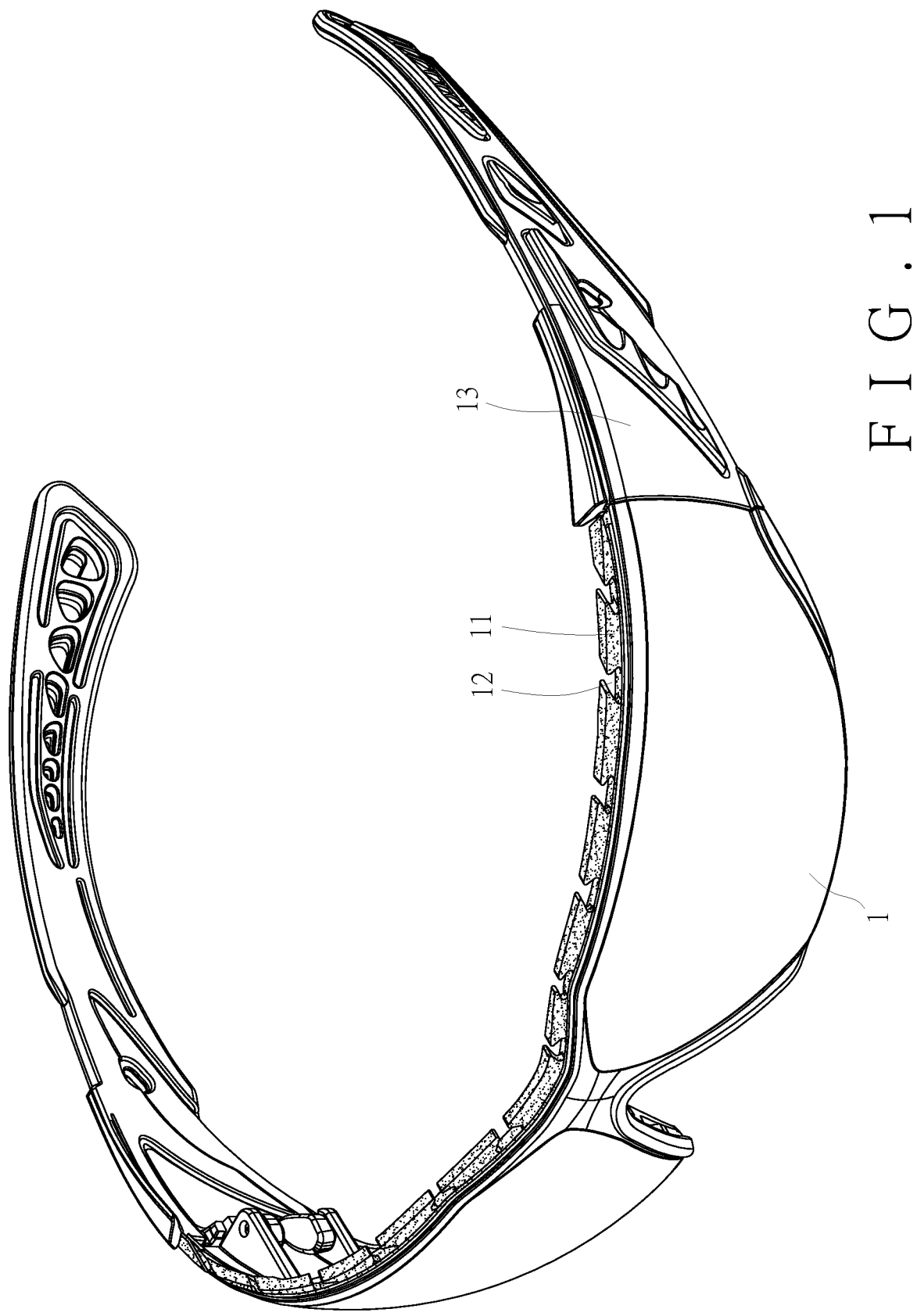
F I G . 1

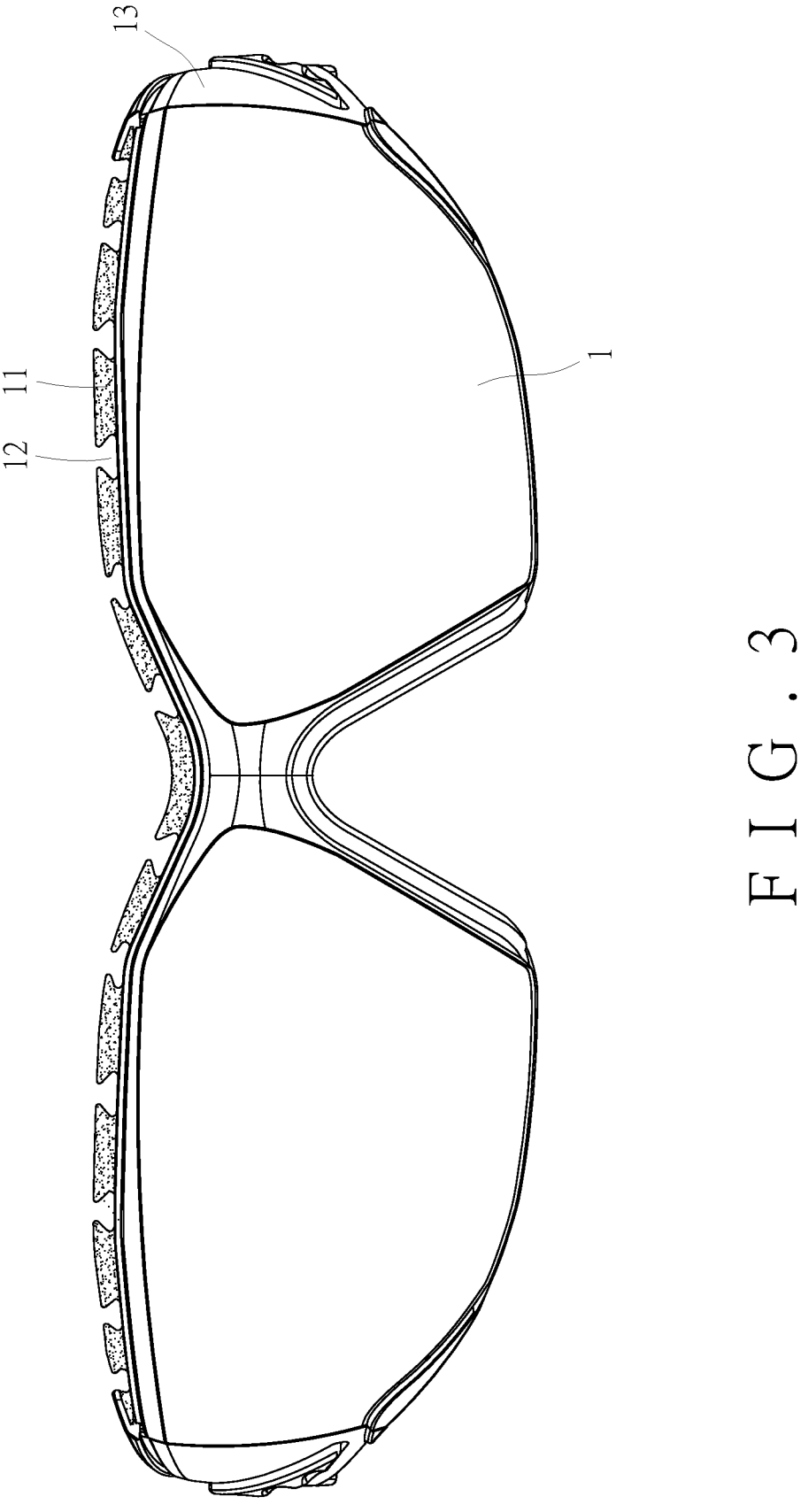
F I G . 3

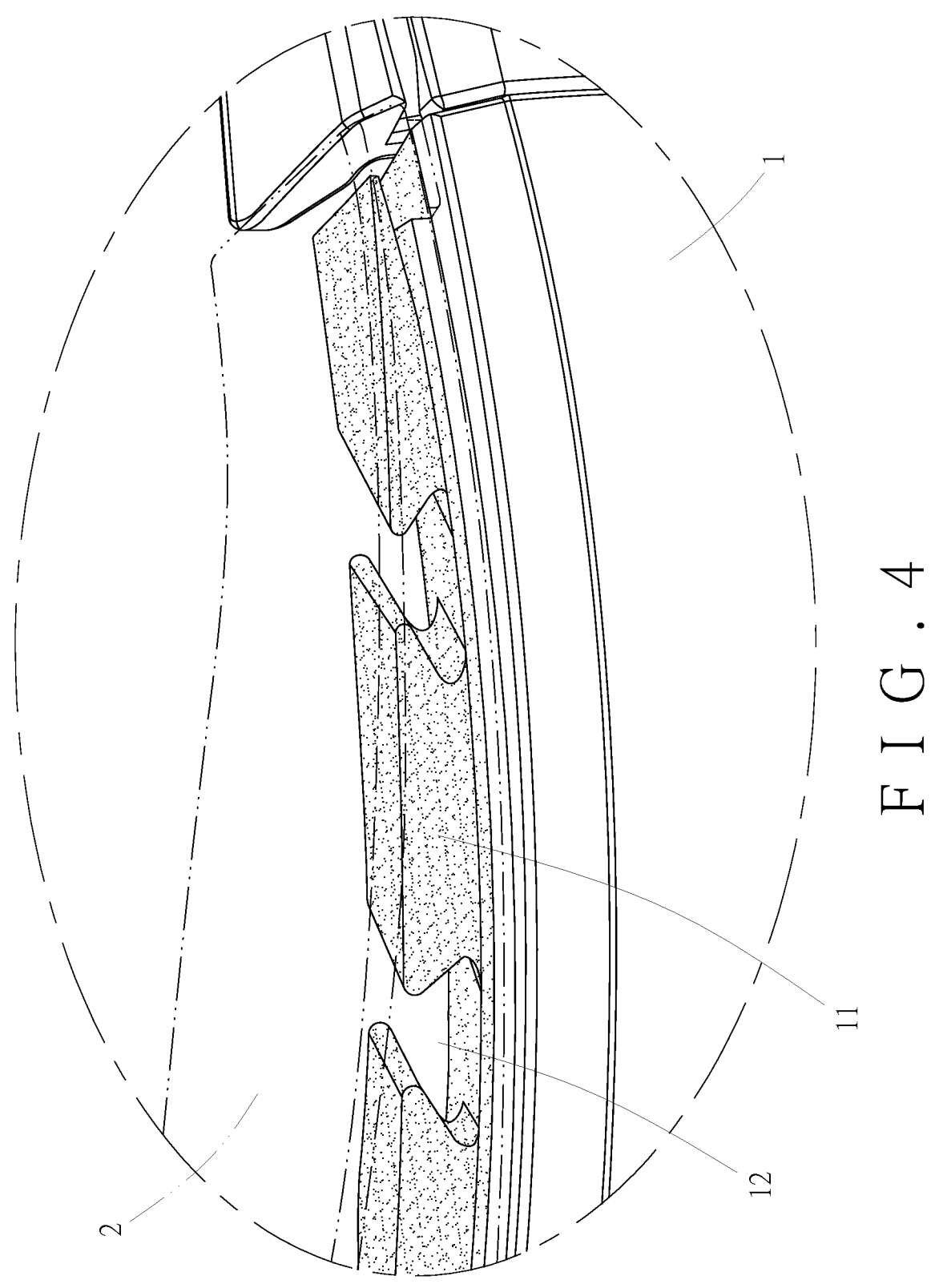
F I G . 4

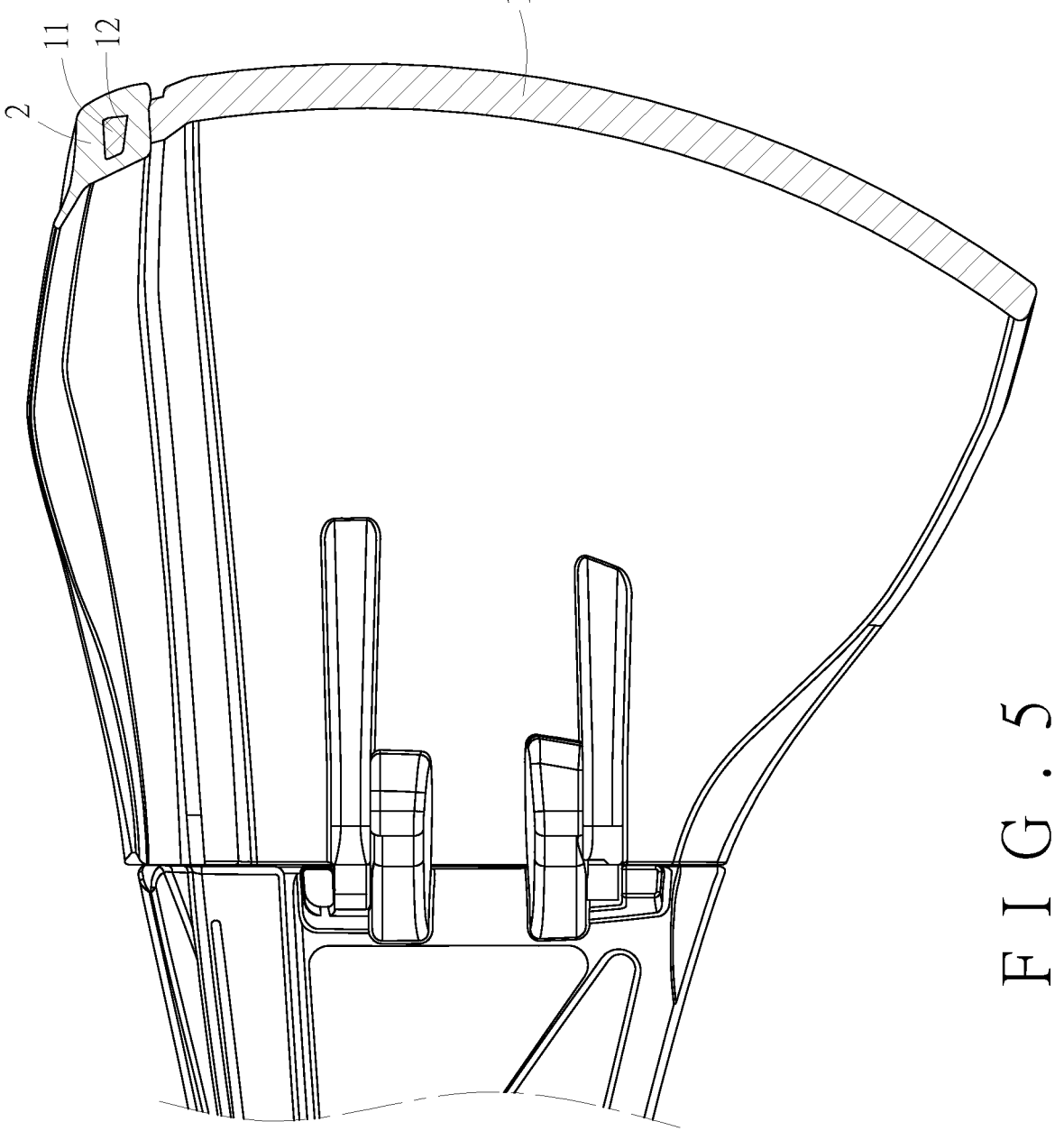
F I G . 5

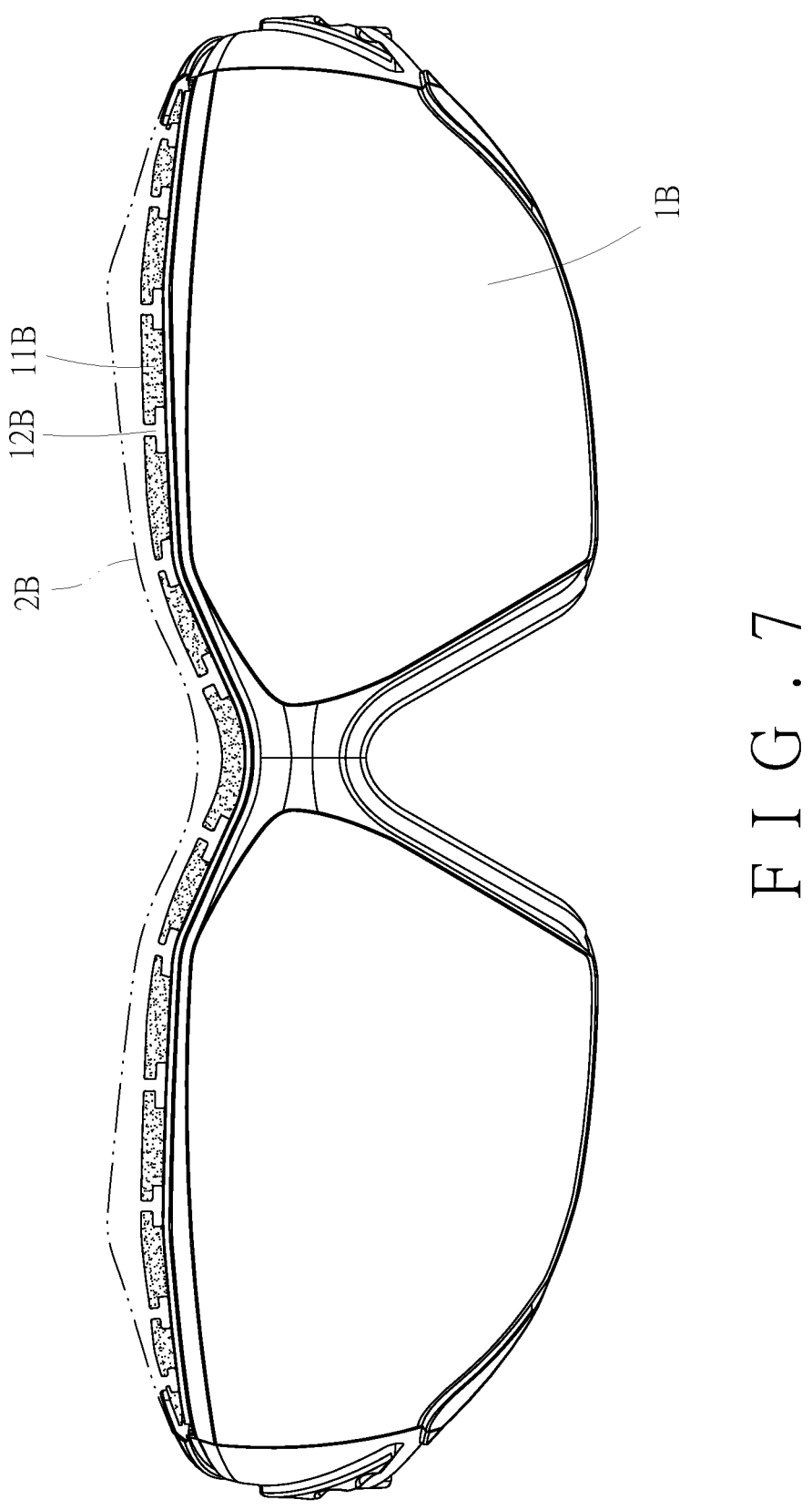
F I G . 7

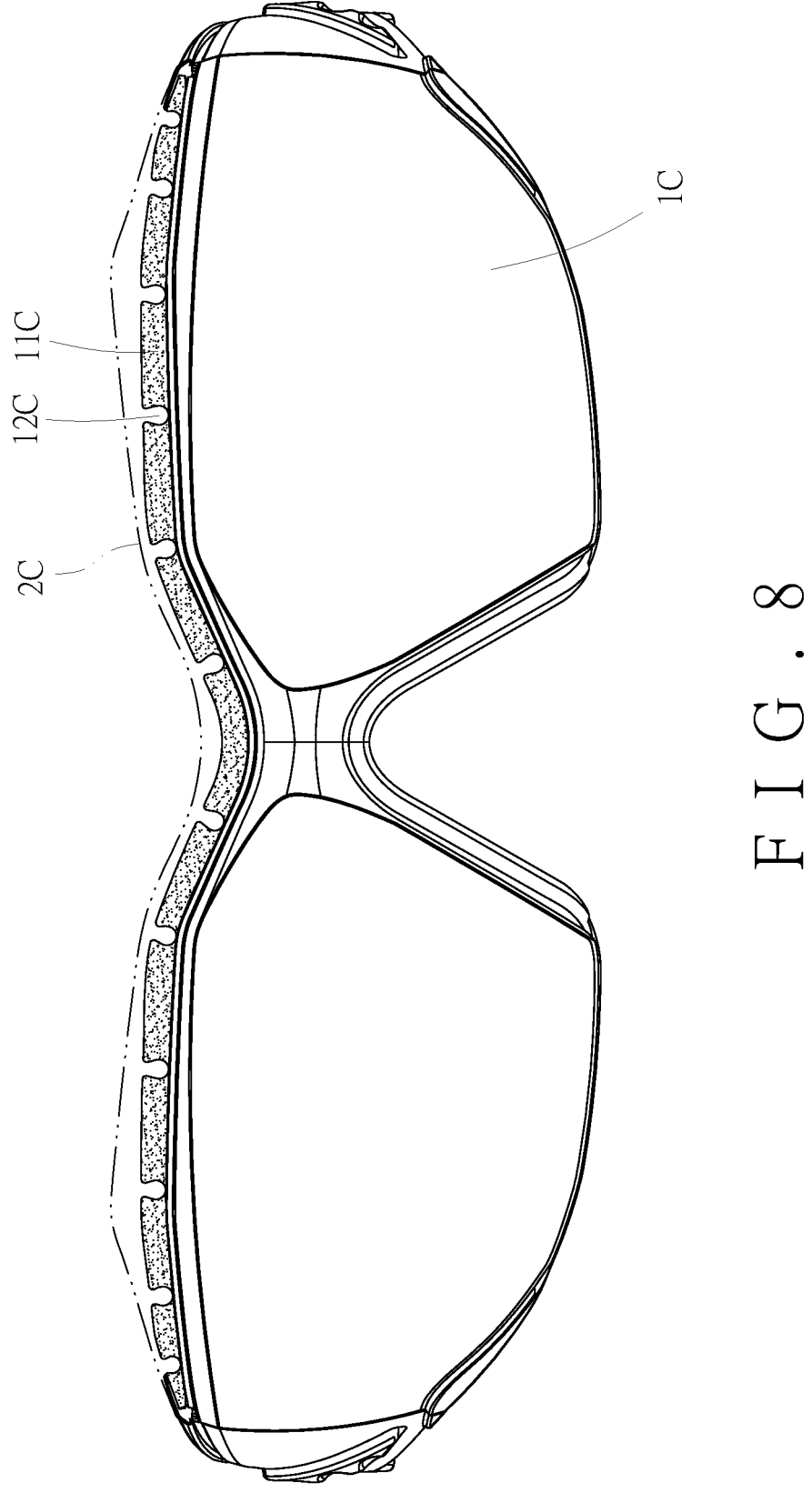
F I G . 8

COMBINED STRUCTURE OF LENS AND SOFT ELASTOMER

BACKGROUND OF THE INVENTION

1. Technical Field

The present invention relates to a combined structure of a lens and an elastomer which features increased engagement between components by roughened surfaces between the components.

2. Description of Related Art

Some existing eyeglasses have a cushion arranged along the upper edge of the lens to increase face fitness and wearing comfort.

For example, Taiwan Utility Patent No. M597878, published on Jul. 1, 2020 has disclosed a TPR eyeglasses structure. It comprises a one-piece lens having a nose bridge portion recessed from its middle lower edge and having two pivot portions at its two sides. A cushion made of thermoplastic rubber (TPR) has an upper frame portion corresponding to the upper edge of the lens and a nose pad corresponding to the nose bridge portion. The upper frame portion and the nose pad are connected by a connecting section. The cushion is integrated with and wraps the lens through injection molding, so that the upper frame portion combines with the upper edge of the lens and the nose pad combines with the nose bridge portion. Then two temples are pivotally connected to the pivot portions of the lens with their respective pivot front ends. The resulting structure purported to be simple, lightweight, easy to assemble, aesthetic, anti-slip, and comfortable to wear.

In the prior-art document, the cushion is made of thermoplastic rubber and is formed on to the lens through injection molding, so as to provide an esthetic appearance as well as snit-slip effect and wearing comfort. However, since the lens has a smooth surface, in particular the coated surface devoid of capillary pore, it is difficult for the elastomer (i.e., the cushion) to always hold the lens firmly particularly after long use. As a result, the elastomer may come off from the lens, and if this happens in use, the user may be endangered in terms industrial safety.

As a solution, Taiwan Utility Patent No. M619746, published on Nov. 11, 2021, has disclosed a structure of eyeglasses, which comprises a lens unit, a cushion unit, and a wearing unit. The lens unit includes two spaced lens portions, a nose mount portion integrated with and connected between the lens portions, and a top portion integrated with upper edges of the lens portions and the nose mount portion. The cushion unit is formed to wrap the top portion and the nose mount portion of the lens unit through an over-molding process. The cushion unit is soft and includes a soft frame portion that wraps and combines with the top portion, and a nose-pad portion that integratedly extends downward from the center of the soft frame portion to wrap and combine with the nose mount portion. The wearing unit is formed at left and right sides of the lens unit. The cushion unit over molded around the lens unit helps provide firm combination. Therein, the top portion has several through holes that are spaced transversely and communicated with frond and back sides. The soft frame portion has inserts quantitively equal to and filled in the through holes. The insets are made to prevent separation between the top portion and the soft frame portion and ensure firm combination.

However, the prior-art device also has a smooth surface. In particular, after being coated, the smooth lens surface devoid of capillary pores is even more adverse to engagement between the inserts and the inner rims of the through holes, leading to increased risks of separation and danger in use, and hence needs to be improved.

SUMMARY OF THE INVENTION

In view of the foregoing defects of the existing combined structure caused by inferior engagement between lenses and cushions (elastomer materials), the present invention provides a combined structure of a lens and a soft elastomer, which comprises: the lens, having an upper edge that includes a combining portion, wherein the combining portion has at least one surface formed as a roughened surface; and the elastomer, being integrated with the combining portion as a unity through an over-molding process, so that the elastomer firmly and tightly engages with the roughened surface of the combining portion to achieve all-around combination of the combined structure.

The roughened surface is formed on a front surface and/or a back surface of the combining portion through a texturing or sand blasting process.

The back surface of the combining portion is a surface that is in contact with a face of a user when the lens is put on the face of the user, whereas the front surface of the combining portion is an opposite surface that is not in contact with the face of the user when the lens is put on the face of the user.

The lens has two opposite laterals each being pivotally connected with a temple.

The elastomer is made of a soft thermoplastic elastomer material.

The combining portion is provided with a plurality of openings that are serially arranged.

The elastomer penetrates the openings and tightly engages with an inner rim of each of the openings, so that the elastomer firmly wraps up the combining portion.

Each of the openings has the inner rim formed as a part of the roughened surface.

The openings are each of a dovetail-like, circular, rectangular and/or droplet-like shape.

The elastomer extends downward to form a nose-pad at a lower edge of the lens.

The technical features described above provide the following advantages:

1. By roughening the surface of the combining portion and the inner rims of the openings of the lens, enhanced engaging force in these areas and in turn all-around firm and tight combination between the combining portion of the lens and the elastomer can be achieved, thereby preventing separation between the elastomer and the lens.

2. Since the elastomer is integrated with the combining portion of the lens as a unity through an over-molding process, the resulting eyeglasses can be structurally simple and lightweight, thereby achieving easy assembly and weight optimization. By using elastomers of different colors and shaping the elastomer differently, the eyeglasses can have esthetics and fashionable appearance while providing functional advantages such as anti-slip effect, wearing comfort, and face fitness to users.

3. With the firm and close engagement between the elastomer and the inner rims of the dovetail-like, circular, rectangular or droplet-shaped openings, the elastomer can wrap the combining portion of the lens with enhanced firmness.

4. Since the elastomer and the lens are firmly combined and prevented from unintentional separation, use safety can be ensured.

BRIEF DESCRIPTION OF THE DRAWINGS

FIG. 1 is a perspective view of a lens according to a first embodiment of the present invention.

FIG. 3 is a schematic drawing of the eyeglasses of the first embodiment of the present invention made with dovetail-shaped openings.

FIG. 4 is a zoom-in view of Part IV in FIG. 2.

FIG. 5 is a cross-sectional view taken along Line V-V in FIG. 2.

FIG. 7 is a schematic drawing of the eyeglasses of the third embodiment of the present invention made with rectangular openings.

FIG. 8 is a schematic drawing of the eyeglasses of the fourth embodiment of the present invention made with droplet-shaped openings.

DETAILED DESCRIPTION OF THE INVENTION

It is to be noted that spatial descriptions, such as "left," "right," "front," "back," "up," "down," and so forth, as used to describe elements in the embodiments of the present invention are based on the directions the eyeglasses (referring to FIG. 2) itself faces, and form no limitations to the spatial aspects of the present invention.

Figure 2:
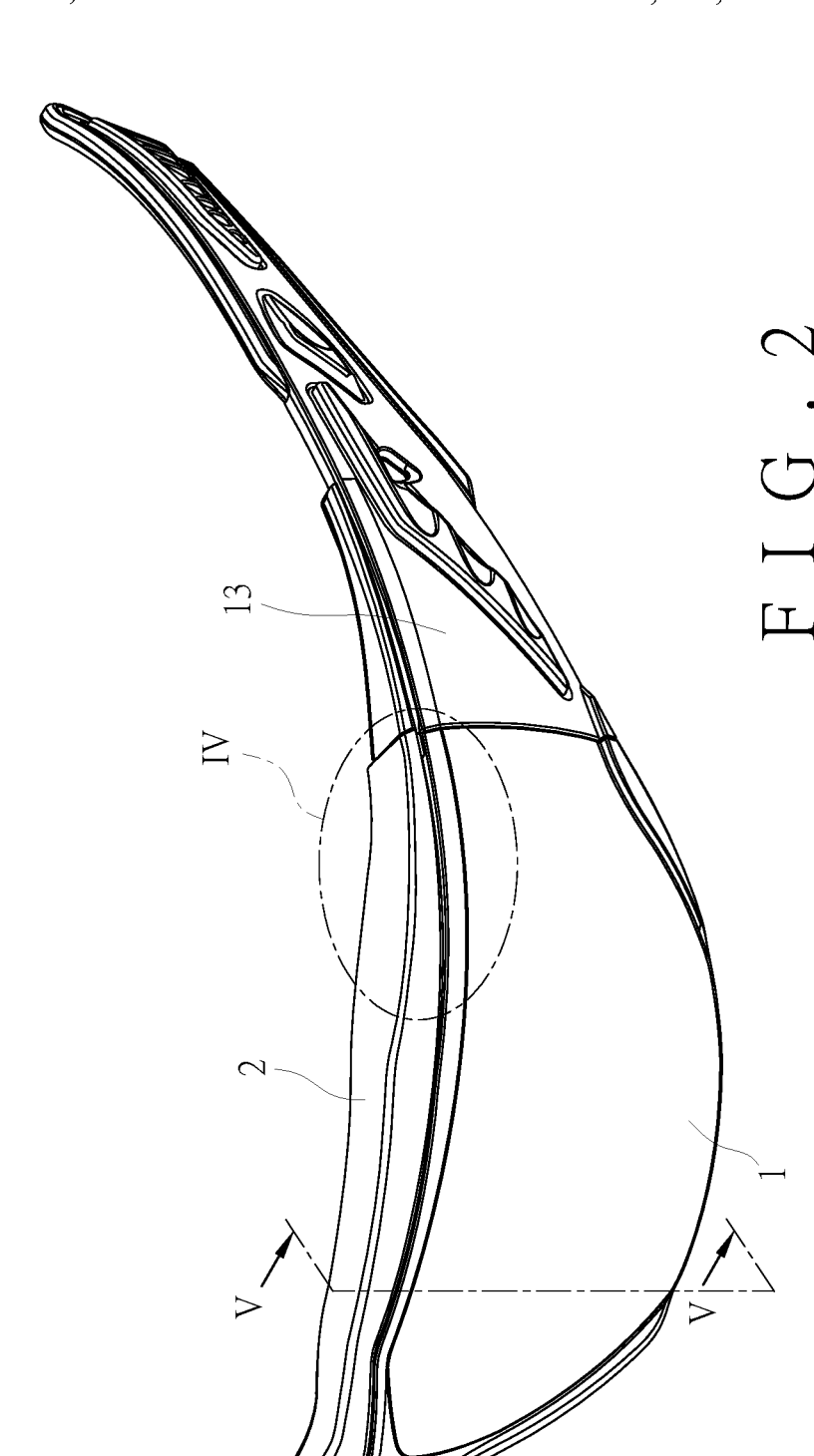
FIG. 2 is a perspective view of combination of the lens and an elastomer according to the first embodiment of the present invention.

Referring to FIG. 1, FIG. 2, and FIG. 3, the first embodiment of the present invention comprises a lens 1 and an elastomer 2.

The lens 1 has an upper edge that includes a combining portion 11. At least one surface of the combining portion 11 is formed as a roughened surface. The roughened surface is formed by texturing or sand blasting at least one of the front surface and/or the back surface of the combining portion 11. Therein, the back surface of the combining portion 11 is the surface that is in contact with a face of a user when the lens is put on the face of the user, whereas the front surface of the combining portion 11 is the opposite surface that is not in contact with the face of the user when the lens is put on the face of the user. The combining portion 11 is provided with a plurality of dovetail-shaped openings 12 serially arranged. Each of the openings 12 has its inner rim formed as a part of the roughened surface. Besides, the lens 1 has two opposite laterals each being pivotally connected with a temple 13.

The elastomer 2 is made of a soft thermoplastic elastomer (TPE) material, and integrated with the combining portion 11 of the lens 1 through an over-molding process. The elastomer 2 extends downward to form a nose-pad 21 at a lower edge of the lens 1. By roughening the surface of the combining portion 11, enhanced engaging force and in turn all-around firm and tight combination between the elastomer 2 and the combining portion 11 and the elastomer can be achieved. Further, the elastomer 2 can penetrate the dovetail-shaped openings 12 and tightly engage with an inner rim of each of the openings, to further strengthen the combination, so that the elastomer 2 firmly wraps up the combining portion 11 at the upper edge of the lens 1 (as shown in FIG. 4 and FIG. 5), thereby forming the eyeglasses. The eyeglasses may be protective eyeglasses for medical use, protective eyeglasses for industrial safety, sunglasses for eye protection, eyeglasses for visual correction, sports eyeglasses, or decorative eyeglasses.

To prevent uncomforting wearing experience and, in particular, poor face fitness caused by the lens 1 made of rigid plastic, the lens 1 of present invention has its upper edge formed with the combining portion 11 that is firmly combined with the soft the elastomer 2, so as to make the eyeglasses comfortable to wear and face-fitting. The softness of the elastomer 2 allows the eyeglasses to be worn for hours without causing discomfort and burdened feeling to the user, thereby being suitable to be used as goggles or sports eyeglasses. Particularly, when being used as goggles, or protective eyeglasses, use safety is ensured because the elastomer 2 and the lens 1 are firmly combined without the risk of unintentional separation. Since the elastomer 2 is integrated with and wraps up the combining portion 11 of the lens 1 as a unity through an over-molding process, the resulting eyeglasses can be structurally simple and lightweight, thereby achieving easy assembly and weight optimization. The elastomer 2 also adds esthetic effects while providing functional advantages such as anti-slip effect, wearing comfort, and face fitness to users.

Figure 6:
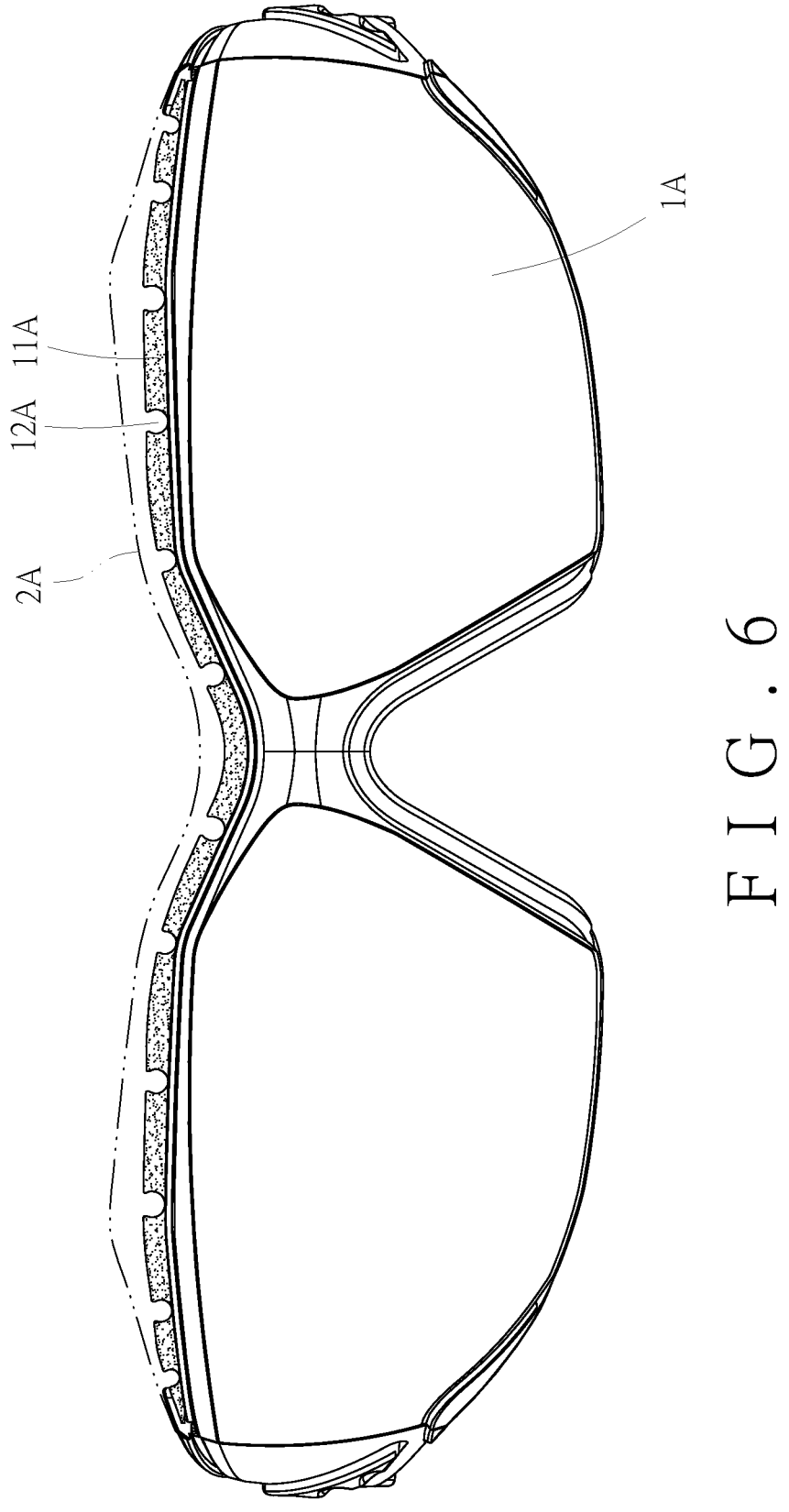
FIG. 6 is a schematic drawing of the eyeglasses of the second embodiment of the present invention made with circular openings.

Referring to FIG. 6, the second embodiment of the present invention comprises a lens 1A and an elastomer 2A.

The lens 1A has an upper edge that includes a combining portion 11A. At least one surface of the combining portion 11A is formed as a roughened surface. The combining portion 11A is provided with a plurality of circular openings 12A serially arranged.

The elastomer 2A is made of a soft thermoplastic elastomer material, and integrated with the combining portion 11A of the lens 1A through an over-molding process. By roughening both the surface of the combining portion 11A and the inner rims of the openings 12A thereof, engaging force can be enhanced. The elastomer 2A can penetrate the circular openings 12A and tightly engage with an inner rim of each of the openings 12A to strengthen the combination, so that the elastomer 2A and the lens 1A are prevented from unintentional separation. This strengthened combination prevents separation of the components in use, thereby ensuring user safety and protecting user eyes.

Referring to FIG. 7, the second embodiment of the present invention comprises a lens 1B and an elastomer 2B.

The lens 1B has an upper edge that includes a combining portion 11B. At least one surface of the combining portion 11B is formed as a roughened surface. The combining portion 11B is provided with a plurality of rectangular opening 12B serially arranged.

The elastomer 2B is made of a soft thermoplastic elastomer material, and integrated with the combining portion 11B of the lens 1B through an over-molding process. By roughening both the surface of the combining portion 11B and the inner rims of the openings 12B thereof, the elastomer 2B can penetrate the rectangular openings 12B and tightly engage with an inner rim of each of the openings 12B to strengthen the combination, so that the elastomer 2B and the lens 1B are prevented from unintentional separation, thereby ensuring industrial safety.

Referring to FIG. 8, the third embodiment of the present invention comprises a lens 1C and an elastomer 2C.

The lens 1C has an upper edge that includes a combining portion 11C. At least one surface of the combining portion 11C is formed as a roughened surface. The combining portion 11C is provided with a plurality of droplet-shaped openings 12C serially arranged.

The elastomer 2C is made of a soft thermoplastic elastomer material, and integrated with the combining portion 11C of the lens 1C through an over-molding process. By roughening both the surface of the combining portion 11C and the inner rims of the openings 12C thereof, enhanced engaging force and all-around combination between the elastomer 2C and the combining portion 11C can be achieved. The elastomer 2C can penetrate the droplet-shaped openings 12C and tightly engage with an inner rim of each of the openings 12C to strengthen the combination, so that the elastomer 2C can firmly wrap the combining portion 11C at the upper edge of the lens 1C. As a result, the elastomer 2C and the lens 1C are prevented from unintentional separation.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A combined structure of a lens and a soft elastomer, the combined structure comprising:

the lens having an upper edge, said upper edge including a combining portion, wherein the combining portion has at least one surface formed as a roughened surface, and wherein said roughened surface of said at least one surface of said combining portion is configured with a plurality of openings; and the soft elastomer filling said plurality of openings and thus permanently joined with the combining portion of the lens into an integral unit through an over-molding process, wherein the soft elastomer firmly and tightly engages with the roughened surface of the combining portion of the lens to achieve all-around combination of the combined structure.

2. The combined structure of claim 1, wherein the roughened surface is formed on a front surface and/or a back surface of the combining portion through a texturing or sand blasting process.

3. The combined structure of claim 2, wherein the back surface of the combining portion is a surface that is in contact with a face of a user when the lens is put on the face of the user, whereas the front surface of the combining portion is an opposite surface that is not in contact with the face of the user when the lens is put on the face of the user.

4. The combined structure of claim 1, wherein the lens has two opposite laterals each being pivotally connected with a temple.

5. The combined structure of claim 1, wherein the elastomer is made of a soft thermoplastic elastomer material.

6. The combined structure of claim 1, wherein the plurality of openings formed at the combining portion are serially arranged.

7. The combined structure of claim 6, wherein the elastomer penetrates the openings and tightly engages with an inner rim of each of the openings, so that the elastomer firmly wraps up the combining portion.

8. The combined structure of claim 7, wherein each of the openings has the inner rim formed as a part of the roughened surface.

9. The combined structure of claim 7, wherein the openings are each of a dovetail-like, circular, rectangular and/or droplet-like shape.

10. The combined structure of claim 1, wherein the elastomer extends downward to form a nose-pad at a lower edge of the lens.

* * * * *